(12) United States Patent
Lin

(10) Patent No.: US 7,852,427 B2
(45) Date of Patent: Dec. 14, 2010

(54) BACK BEZEL ASSEMBLY FOR A BACKLIGHT MODULE

(75) Inventor: Ming-Chien Lin, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 186 days.

(21) Appl. No.: 12/177,580

(22) Filed: Jul. 22, 2008

(65) Prior Publication Data

US 2009/0244430 A1 Oct. 1, 2009

(30) Foreign Application Priority Data

Mar. 31, 2008 (TW) .............................. 97111776 A

(51) Int. Cl.
*G02F 1/1333* (2006.01)

(52) U.S. Cl. ...................................................... 349/58

(58) Field of Classification Search ................. None
See application file for complete search history.

(56) References Cited

U.S. PATENT DOCUMENTS

| | | | | |
|---|---|---|---|---|
| 5,255,109 A | * | 10/1993 | Klein | ............................ 349/84 |
| 6,407,781 B2 | * | 6/2002 | Kitada | ........................... 349/58 |
| 6,933,990 B2 | | 8/2005 | Park | |
| 2004/0032725 A1 | * | 2/2004 | Hsieh et al. | ..................... 362/31 |
| 2005/0185380 A1 | * | 8/2005 | Lee | .............................. 361/704 |
| 2007/0053205 A1 | * | 3/2007 | Jang et al. | ..................... 362/609 |
| 2007/0058376 A1 | * | 3/2007 | Suzuki | ......................... 362/368 |
| 2008/0117351 A1 | * | 5/2008 | Cho et al. | ...................... 349/58 |

FOREIGN PATENT DOCUMENTS

| | | |
|---|---|---|
| CN | 1387072 | 12/2002 |
| TW | M260748 | 4/2005 |
| TW | M298720 | 10/2006 |

OTHER PUBLICATIONS

Chinese language office action dated Apr. 24, 2009.
English language translation of abstract of TW M260748.
English language translation of abstract of TW M298720.

* cited by examiner

*Primary Examiner*—Mike Stahl
(74) *Attorney, Agent, or Firm*—Thomas, Kayden, Horstemeyer & Risley, LLP

(57) ABSTRACT

A back bezel assembly for a backlight module is provided. The back bezel comprises a first board and a second board, which are assembled at the edges thereof to form a continuous board. The thermal conductivity of the second board is less than that of the first board. A light source and an inverter are disposed at the opposite sides with respect to the second board, so the second board isolates the heat, generated from the light source device, from being conducted toward the inverter.

14 Claims, 2 Drawing Sheets

BACK BEZEL ASSEMBLY FOR A BACKLIGHT MODULE

This application claims priority to Taiwan Patent Application No. 097111776 filed on Mar. 31, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a back bezel assembly for a backlight module of a liquid crystal display (LCD), and more particularly, relates to a back bezel assembly that facilitates thermal conduction.

2. Descriptions of the Related Art

The continuous advancement of photoelectronic technologies and digitalization of image displaying technologies have led to the widespread use of various displays in people's daily life. Among these displays, liquid crystal displays (LCDs) have been widely used in various electronic products due to their advantages such as high definition, light weight, thin profile, low power consumption, and lack of radiation. As a result, LCDs have gradually replaced conventional cathode ray tube (CRT) displays as the mainstream product in the display market.

A conventional backlight module of the direct lighting type is depicted in FIGS. 1A and 1B, in which FIG. 1B is a schematic cross-sectional view taken along line A-A in FIG. 1A. The backlight module 1 comprises a back bezel 11, a light source device 12, an inverter 13 and an insulation pad 15. The light source device 12 is disposed on the front surface of the back bezel 11, while the insulation pad 15 is partially disposed on the back surface of the back bezel 11. The inverter 13 is disposed on the insulation pad 15 above the back surface of the back bezel 11 opposite the light source device 12, and is electrically connected with the light source device 12.

To achieve a better LCD display, commercially available LCDs typically prefer to adopt a light source with higher luminance. However, a light source device 12 with higher luminance tends to generate more heat during operation, in addition to the heat generated by the large current and high voltage of the inverter 13 under operation.

To dissipate the heat generated inside the backlight module 1, the conventional back bezel 11 is typically integrally formed by stamping a metallic material in an attempt to improve the heat dissipation of the backlight module 1 as a whole. However, because the inverter 13 and a portion of the light source device 12 are generally disposed in an overlapping configuration, heat generated from both the inverter 13 and the light source device 12 causes a higher temperature in local areas of the backlight module 1. For example, intense heat from the light source device 12 is transferred through the back bezel 11 to the insulation pad 15, which is in direct contact with the back bezel 11, and then conducted therefrom to the inverter 13. This intense heat plus the heat generated by the inverter 13 itself will cause a higher temperature in this local area, leading to performance degradation or even failure of the inverter 13. Moreover, the overlapped components may add to material usage and overall weight of the product, which increases the profile and weight.

In view of this, it is important to provide a back bezel assembly which is lightweight and delivers a better heat dissipating effect.

SUMMARY OF THE INVENTION

One objective of this invention is to provide a back bezel assembly for a backlight module. The back bezel assembly is adapted to isolate heat conduction between a light source device and an inverter. In addition, the back bezel assembly facilitates a uniform distribution of the heat generated from the light source device and dissipates the heat towards the preferred direction. As a result, this back bezel assembly can avoid heat concentration and ensure normal operation of the inverter and the light source device.

Another objective of this invention is to provide a back bezel assembly for a backlight module. The back bezel assembly is partially made of a lightweight insulation material to eliminate unnecessary usage of materials and reduce the weight while still achieving an improved heat dissipating effect. This helps to reduce the cost and create a low-profile backlight module, thus promoting the competitiveness of the product.

The back bezel assembly disclosed in this invention comprises a first board and a second board. An edge of the second board is capable of being assembled to an edge of the first board to form a substantially continuous board, while the second board has a thermal conductivity less than that of the first board.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
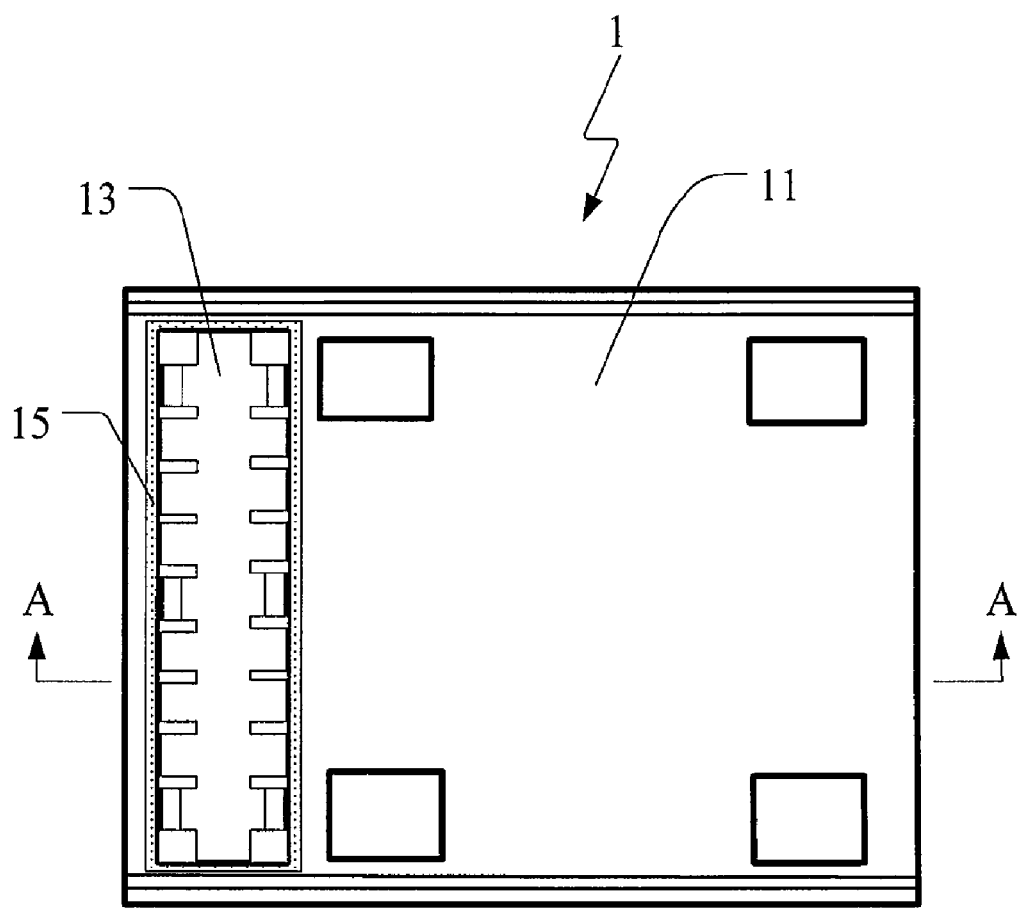
FIG. 1A is a schematic plan view of a conventional backlight module.
Figure 1B:
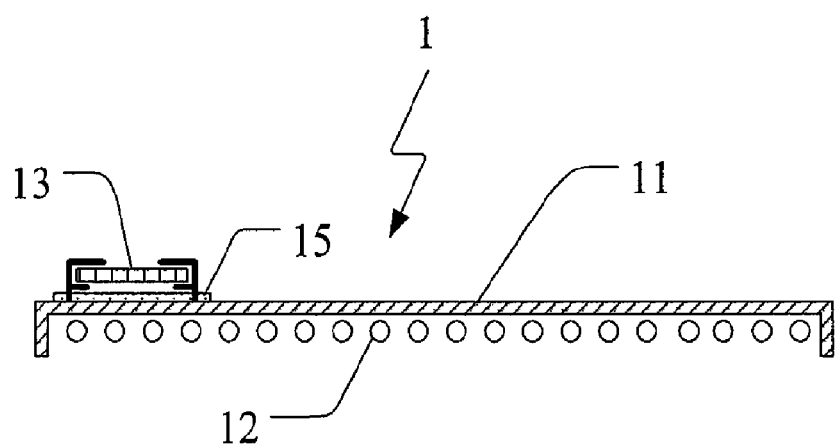
FIG. 1B is a schematic cross-sectional view of the conventional backlight module taken along line A-A.
Figure 2A:
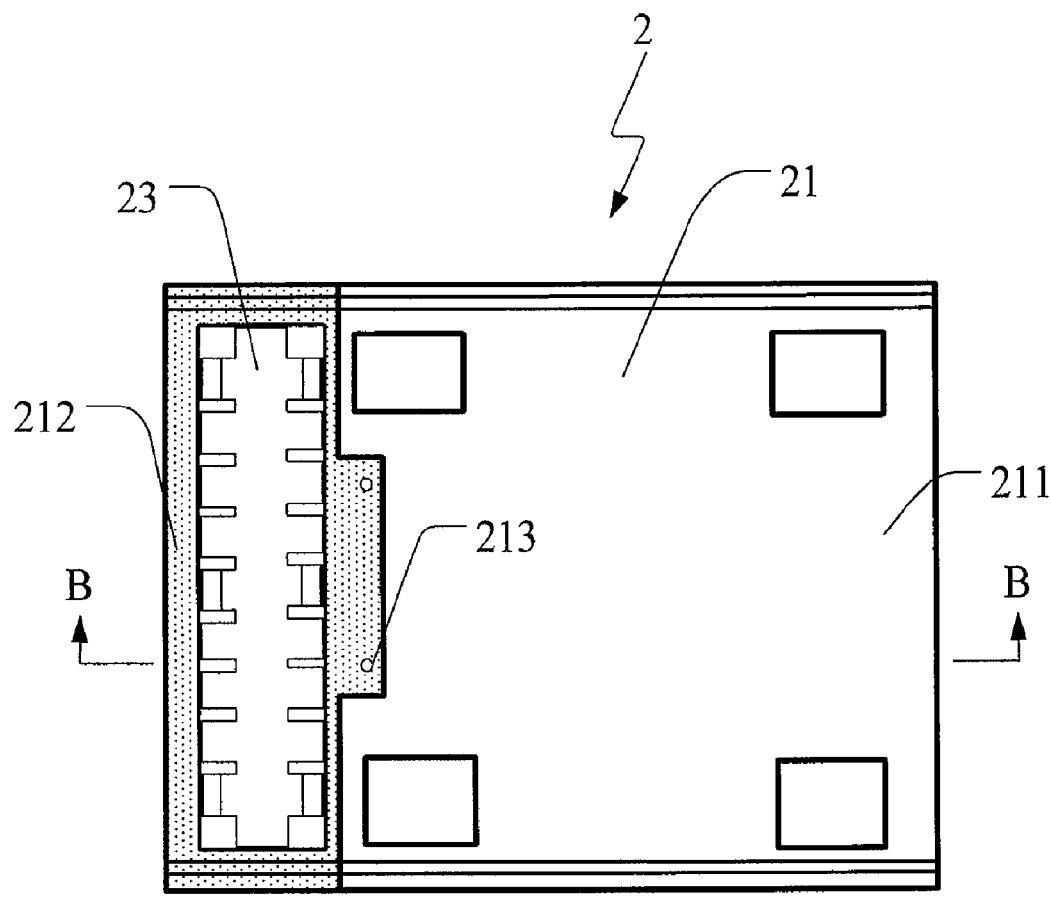
FIG. 2A is a schematic plan view of a backlight module of this invention.
Figure 2B:
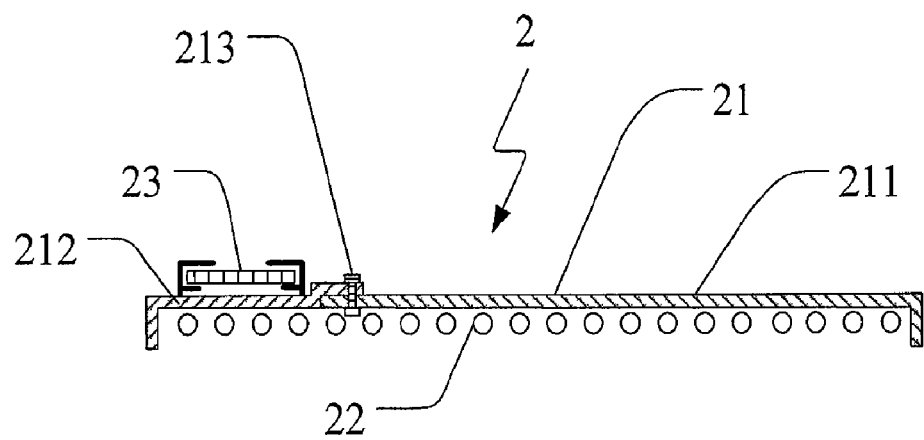
FIG. 2B is a schematic cross-sectional view of the backlight module of this invention taken along line B-B.

FIG. 2B is a schematic cross-sectional view taken along a line B-B of FIG. 2A. A backlight module 2 of this invention at least comprises a back bezel assembly 21, a light source device 22 and an inverter 23. The back bezel assembly 21 is disposed on the light source device 22 and the inverter 23 is disposed on the back bezel assembly 21. The light source device 22 and the inverter 23 are substantially isolated by the back bezel assembly 21. More specifically, to prevent the local high temperature environment due to the intense heat generated from the light source device, the back bezel assembly 21 of this invention has different portions thereof made of materials with the different thermal conductivities to isolate the intense heat, generated from the light source device 22, from being conducted toward the inverter 23 while still maintaining heat dissipation of the light source device 22. The light source device 22 of this invention may be comprised of a cold cathode fluorescent lamp (CCFL) or a light-emitting diode (LED). Alternatively, other light sources known by those of ordinary skill in the art may also be used instead, in which case the back bezel assembly 21 of this invention can also be used for effective heat isolation and dissipation. Therefore, no limitation is made on the selection of the light source device 22 herein.

The back bezel assembly 21 has different two portions and comprises a first board 211 and a second board 212 each with an edge respectively. The edge of the second board 212 is adapted to be assembled on the edge of the first board 211 to form a continuous board, i.e., form the back bezel assembly 21 of this invention. The feature of this invention is that the thermal conductivity of the second board 212 is less than that of the first board 211. The light source device 22 and the inverter 23 are disposed at the opposite sides of the second board 212, so that intense heat generated from the light source device 22 is effectively isolated by the second board 212. By using the first board 211 with a higher thermal conductivity, the intense heat generated from the light source device 22 is possible to be conducted outwards to dissipate. Consequently, the normal operation of the inverter 23 is ensured without any influence of the intense heat, thus allowing the light source device 22 to emit light uniformly.

The first board 211 with a higher thermal conductivity may be made of a metallic material. Preferably, the first board 211 is made of a material selected from the group consisting of galvanized steel, aluminum, aluminum alloy, and the combination thereof. Accordingly, the second board 212 has a lower thermal conductivity that may be made of a non-metallic material, and in this embodiment, is made of a plastic material. Preferably, the plastic material is selected from the group consisting of polycarbonate (PC), acrylonitrile butadiene styrene copolymer (ABS), and the combination thereof. In this case, because the material of the second board 212 is also of an electrically non-conductive nature, the conventional insulation pad may be eliminated while electrical insulation is still achieved between the second board 212 and the inverter 23 without the risk of current leakage.

To ensure that the first board 211 and the second board 212 can be fixed together by connecting the respective edges with each other, the back bezel assembly 21 of this invention further comprises a connecting device 213. In this embodiment, the edge of the first board 211 and the edge of the second board 212 are at least partially overlapped, and the connecting device 213 may have a male structure and a female structure fitting with the male structure. In this way, the first board 211 and the second board 212 are fixed together by means of the male structure and the female structure. More specifically, the female structure may be a plurality of through-holes formed through the overlapped portions of the edges of the first board 211 and the second board 212. The male structure may be screws, rivets or the combination thereof, which are inserted through the through-holes to connect the first board 211 and the second board 212 together. In other examples, the connecting device 213 fixed the first board 211 and the second board 212 is not merely limited to screws, rivets or the like. In addition, the male structure and the female structure may be formed on the edges of the first board 211 and the second board 212 respectively so that the first board 211 and the second board 212 can be directly snap-fitted together. Alternatively, the first board 211 and the second board 212 may be adhered together by glue or a hot-melt adhesive. All the manners set forth herein may accomplish the goal of fixing the first board 211 and the second board 212 together. Therefore, the previously described connecting manner is only provided for illustration rather than to limit the scope of this invention. Other equivalent fixing manners may readily occur to those of ordinary skill in the art.

It follows from the above description that the back bezel assembly of this invention is able to isolate heat conduction between the light source device and the inverter, dissipate heat in a uniform way and eliminate the unnecessary usage of materials. These factors help in reducing the cost and result in a low-profile and lightweight backlight module.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A back bezel assembly for a backlight module comprising an inverter, the back bezel assembly comprising:
   a first board having an edge; and
   a second board having an edge;
   wherein the edge of the second board is assembled to the edge of the first board to form a continuous board, and a thermal conductivity of the second board is less than a thermal conductivity of the first board, and the first board does not overlap the second board at a location where the inverter is disposed upon.

2. The back bezel assembly as claimed in claim 1, wherein the first board is made of a metallic material.

3. The back bezel assembly as claimed in claim 2, wherein the metallic material is selected from the group consisting of galvanized steel, aluminum, aluminum alloy and the combination thereof.

4. The back bezel assembly as claimed in claim 3, wherein the second board is made of a non-metallic material.

5. The back bezel assembly as claimed in claim 4, wherein the non-metallic material is a plastic material.

6. The back bezel assembly as claimed in claim 5, wherein the plastic material is selected from the group consisting of Polycarbonate (PC), Acrylonitrile Butadiene Styrene copolymer (ABS) and the combination thereof.

7. The back bezel assembly as claimed in claim 1, further comprising a connecting device fastening the edge of the first board and the edge of the second board.

8. The back bezel assembly as claimed in claim 7, wherein the edge of the first board and the edge of the second board are at least partially overlapped.

9. The back bezel assembly as claimed in claim 7, wherein the connecting device has a male structure and a female structure fitting the male structure.

10. The back bezel assembly as claimed in claim 9, wherein the female structure is formed at the edges of the first board and the second board, and the male structure is inserted through the female structure to fasten the first board and the second board.

11. The back bezel assembly as claimed in claim 10, wherein the male structure is selected from the group consisting of screws, rivets and the combination thereof.

12. The back bezel assembly as claimed in claim 9, wherein the male structure and the female structure are respectively formed at the edge of the first board and the edge of the second board for being embedded with each other to fasten the first board and the second board.

13. The back bezel assembly as claimed in claim 1, wherein the edge of the second board and the edge of the first board are fastened with each other by glue or hot-melt adhesive.

14. A backlight module for a liquid crystal display, comprising:
- a light source device;
- a back bezel assembly disposed on the light source device, wherein the back bezel assembly comprises a first board having an edge and a second board having an edge, wherein the edge of the second board is assembled to the edge of the first board to form a continuous board and a thermal conductivity of the second board is less than a thermal conductivity of the first board; and
- an inverter disposed on the second board, wherein the inverter is substantially isolated by the second board and is opposite to the light source with respect to the second board of the back bezel assembly;
- wherein the first board does not overlap the second board at a location where the inverter is disposed upon.

* * * * *